US011625052B2

(12) United States Patent
Bomholt et al.

(10) Patent No.: US 11,625,052 B2
(45) Date of Patent: Apr. 11, 2023

(54) PUMP UNIT

(71) Applicant: GRUNDFOS HOLDING A/S, Bjerringbro (DK)

(72) Inventors: John Bomholt, Hinnerup (DK); Niels Jørgen Strøm, Hinnerup (DK)

(73) Assignee: GRUNDFOS HOLDING A/S, Bjerringbro (DK)

( * ) Notice: Subject to any disclaimer, the term of this patent is extended or adjusted under 35 U.S.C. 154(b) by 391 days.

(21) Appl. No.: 14/345,767

(22) PCT Filed: Sep. 20, 2012

(86) PCT No.: PCT/EP2012/068531
§ 371 (c)(1),
(2) Date: Mar. 19, 2014

(87) PCT Pub. No.: WO2013/041616
PCT Pub. Date: Mar. 28, 2013

(65) Prior Publication Data
US 2014/0229023 A1 Aug. 14, 2014

(30) Foreign Application Priority Data

Sep. 20, 2011 (EP) ...................................... 1007661

(51) Int. Cl.
*G05D 7/06* (2006.01)
*F04D 15/00* (2006.01)
(52) U.S. Cl.
CPC ............... *G05D 7/06* (2013.01); *F04D 15/00* (2013.01); *F04D 15/0066* (2013.01)
(58) Field of Classification Search
CPC ...... F04B 43/04; F04B 43/09; F04D 15/0066; F04D 15/0088; F04D 15/02; F04D 27/00;
(Continued)

(56) References Cited

U.S. PATENT DOCUMENTS 3,975,622 A * 8/1976 Horn .................... G05B 19/056
700/17
4,250,563 A 2/1981 Struger
(Continued)

FOREIGN PATENT DOCUMENTS

CN 102170367 A 8/2011
DE 2938570 A1 4/1981
(Continued)

OTHER PUBLICATIONS

Int'l Search Report dated Mar. 12, 2013 in Int'l Application No. PCT/EP2012/068531.
(Continued)

*Primary Examiner* — Darrin D Dunn
(74) *Attorney, Agent, or Firm* — Panitch Schwarze Belisario & Nadel LLP

(57) ABSTRACT

A pump unit (2) has an electrical drive motor (5) and a control device (4) for controlling the drive motor (5), wherein said control device (4) includes at least one microprocessor (8) and storage means (6) which is able to store at least one control program executable by said microprocessor (8), wherein said control device (4) includes or communicates with a programming module (7) by which at least one user application can be created and/or modified and stored in said storage means, wherein said programming module (7) is designed such that at least one input parameter (13), at least one operator (10) and at least one action (14) can be chosen as program elements and combined to generate at least one user function (18) of said user application which can be executed by said microprocessor.

9 Claims, 9 Drawing Sheets

(58) Field of Classification Search
CPC .......... G05B 23/02; A61M 2205/3592; A61M 2205/502; A61M 2205/52; A61M 2205/581; A61M 2205/582
See application file for complete search history.

(56) References Cited

U.S. PATENT DOCUMENTS

| | | | |
|---|---|---|---|
| 5,259,445 A | 11/1993 | Pratt et al. | |
| 5,329,991 A | 7/1994 | Mehta et al. | |
| 5,787,282 A | 7/1998 | Tanaka et al. | |
| 5,812,394 A * | 9/1998 | Lewis | G05B 19/0426 700/17 |
| 6,464,464 B2 * | 10/2002 | Sabini | F04D 15/0066 318/432 |
| 6,709,241 B2 * | 3/2004 | Sabini | F04D 15/0066 417/43 |
| 7,539,549 B1 * | 5/2009 | Discenzo | F04D 15/0077 324/765.01 |
| 7,925,385 B2 * | 4/2011 | Stavale | F04D 15/0022 417/43 |
| 8,346,399 B2 * | 1/2013 | Blomquist | A61M 5/1452 604/118 |
| 8,436,559 B2 * | 5/2013 | Kidd | F04B 17/03 318/34 |
| 8,465,262 B2 * | 6/2013 | Stiles, Jr. | F04B 49/20 417/326 |
| 8,489,242 B2 * | 7/2013 | Valluri | H02J 3/14 417/12 |
| 8,500,413 B2 * | 8/2013 | Stiles, Jr. | F04B 49/20 210/167.01 |
| 8,543,245 B2 * | 9/2013 | Heitman | F04B 49/065 137/836 |
| 8,546,984 B2 * | 10/2013 | Heilman | H02K 5/10 174/50.5 |
| 8,573,951 B1 * | 11/2013 | Beckham | F04D 15/0077 4/504 |
| 8,641,385 B2 * | 2/2014 | Koehl | F04D 15/0088 417/44.2 |
| 8,774,972 B2 * | 7/2014 | Rusnak | F04D 15/0066 415/122.1 |
| 8,840,376 B2 * | 9/2014 | Stiles, Jr. | F04B 49/20 417/12 |
| 8,858,526 B2 * | 10/2014 | Blomquist | A61M 5/172 604/131 |
| 9,051,930 B2 * | 6/2015 | Stiles, Jr. | F04B 49/20 |
| 9,399,992 B2 * | 7/2016 | Koehl | F04D 15/0088 |
| 2001/0041139 A1 * | 11/2001 | Sabini | F04D 15/0066 417/18 |
| 2002/0013629 A1 * | 1/2002 | Nixon | G05B 19/0421 700/4 |
| 2003/0091443 A1 * | 5/2003 | Sabini | F04D 15/0066 417/53 |
| 2003/0163789 A1 * | 8/2003 | Blomquist | A61M 5/142 715/234 |
| 2005/0123408 A1 | 6/2005 | Koehl | |
| 2005/0196284 A1 * | 9/2005 | Gaudet | F04B 37/08 417/44.1 |
| 2006/0041287 A1 * | 2/2006 | Dewing | A61M 5/14276 607/60 |
| 2006/0195433 A1 * | 8/2006 | Kim | G06F 17/30654 |
| 2006/0258985 A1 * | 11/2006 | Russell | A61M 5/14212 604/151 |
| 2007/0130093 A1 * | 6/2007 | Haji-Valizadeh | E03B 7/02 705/413 |
| 2007/0154321 A1 * | 7/2007 | Stiles | F04B 49/20 417/44.1 |
| 2007/0154322 A1 * | 7/2007 | Stiles, Jr. | F04B 49/20 417/44.1 |
| 2007/0154323 A1 * | 7/2007 | Stiles | F04B 49/20 417/44.1 |
| 2007/0180207 A1 * | 8/2007 | Garfinkle | G06F 11/1456 711/162 |
| 2008/0039977 A1 * | 2/2008 | Clark | G05D 23/1905 700/282 |
| 2008/0126969 A1 * | 5/2008 | Blomquist | A61M 5/142 715/771 |
| 2008/0172031 A1 * | 7/2008 | Blomquist | G06F 19/3468 604/500 |
| 2008/0181789 A1 * | 7/2008 | Koehl | F04D 15/0088 417/44.11 |
| 2008/0187443 A1 | 8/2008 | Aguilar et al. | |
| 2008/0268469 A1 * | 10/2008 | Srienc | G01N 15/1459 435/7.2 |
| 2008/0288115 A1 * | 11/2008 | Rusnak | F04D 15/0066 700/282 |
| 2009/0055029 A1 * | 2/2009 | Roberson | E21B 47/00 700/282 |
| 2009/0069749 A1 | 3/2009 | Miller et al. | |
| 2009/0082977 A1 | 3/2009 | Parkinson | |
| 2009/0104044 A1 * | 4/2009 | Koehl | F04D 15/0088 417/53 |
| 2009/0200245 A1 * | 8/2009 | Steinbrueck | C02F 1/008 210/741 |
| 2009/0281460 A1 * | 11/2009 | Lowery | A61B 5/1427 600/584 |
| 2010/0077198 A1 * | 3/2010 | Buck | G06F 19/3468 713/100 |
| 2010/0092308 A1 * | 4/2010 | Stiles, Jr. | F04B 49/08 417/44.11 |
| 2010/0254827 A1 * | 10/2010 | Yang | F04B 49/065 417/44.1 |
| 2011/0052416 A1 * | 3/2011 | Stiles | F04B 49/20 417/42 |
| 2011/0202004 A1 * | 8/2011 | Miller | A61M 5/14244 604/151 |
| 2011/0213504 A1 * | 9/2011 | Cedrone | F04B 49/065 700/282 |
| 2011/0280744 A1 * | 11/2011 | Ortiz | F04B 49/065 417/313 |
| 2011/0286859 A1 * | 11/2011 | Ortiz | F04B 49/002 417/20 |
| 2011/0295341 A1 * | 12/2011 | Estes | A61M 5/14244 607/67 |
| 2011/0319813 A1 * | 12/2011 | Kamen | A61M 5/14244 604/66 |
| 2012/0020810 A1 * | 1/2012 | Stiles, Jr. | F04B 49/20 417/44.11 |
| 2012/0053737 A1 * | 3/2012 | Valluri | H02J 3/14 700/276 |
| 2012/0104878 A1 * | 5/2012 | Heilman | H02K 5/10 310/43 |
| 2013/0108473 A1 * | 5/2013 | Tamminen | F04B 49/00 417/3 |

FOREIGN PATENT DOCUMENTS

| | | |
|---|---|---|
| DE | 19511170 A1 | 10/1996 |
| DE | 10018866 A1 | 10/2001 |
| EP | 0936729 A1 | 8/1999 |
| EP | 1063751 A1 | 12/2000 |
| EP | 1146231 A2 | 10/2001 |
| EP | 1426621 A1 | 6/2004 |
| EP | 1655484 A1 | 5/2006 |
| EP | 1995462 A2 | 11/2008 |
| EP | 2151578 A1 | 2/2010 |

OTHER PUBLICATIONS

Office Action dated Oct. 19, 2015 in EP Application No. 12759483.6.

Office Action dated Oct. 29, 2015 in CN Application No. 201280045833.9.

Office Action dated May 31, 2017 in EP Application No. 11007661.9.

Wachter, H., "Entwurf und Realisierung von komplexen intelligenten Steuerungssystemen," 150 pages (Apr. 2002) (p. 109 describes a PLC used for controlling a pump).

(56) References Cited

OTHER PUBLICATIONS

Lepers, H., "PC & Elektronik; SPS-Programmierung nach IEC 61131-3," 90 pages (2011) (pp. 24-25 describes a PLC with an operating system and user programs created using functions and function blocks).
Wellenreuther et al., "Automatisieren mit SPS—Theorie und Praxis," 9 pages (2001) (enclosed pages describe memories, user programs, and a PLC associated with the control of pumps).
Opposition issued Jul. 12, 2019 in EP 2758670 (cited to show evidence of relevance, no english translation).
Betriebsanleitung, Basis—Pumpensteuerung, Typ: CPS-B1 / CPS-B2 mit zweizeiligem oder graph. Display, 75 pages, 2009(no translation available, this document is a User Manual for a Pump Control).
Frenic-Eco, Frequenzumrichter fur Pumpensteuerung and HLK-Anwendugen, 56 pages, 2010 (no english translation, this document is a User Manual for frequency converter for pump control).

* cited by examiner a)

b)

PUMP UNIT

CROSS-REFERENCE TO RELATED APPLICATIONS

This application is a Section 371 of International Application No. PCT/EP2012/068531, filed Sep. 20, 2012, which was published in the English language on Mar. 28, 2013, under International Publication No. WO 2013/041616 A1 and the disclosure of which is incorporated herein by reference.

BACKGROUND OF THE INVENTION

Many modern pumps are provided with various types of controls in order to control the pumps in specific ways. Circulation pumps are often intended to deliver a specific head and flow rate at given circumstances in order to meet present requirements. To meet different requirements prior art pumps may be controlled according to different control patterns incorporated in the pump control. Pump control may be adjusted by changing one or more parameters. This may be done by the user of the pump by use of input means provided at the pump itself, for example a switch, or via an interface connected with an external control device.

With such prior art pumps it is difficult to adjust the pump to all different requirements of different uses.

Therefore it is desirable to provide an improved pump unit, which allows a more flexible adjustment of the pump control to individual user requirements.

BRIEF SUMMARY OF THE INVENTION

The pump unit according to the invention comprises an electric drive motor and a pump driven by this electrical motor. Further, the pump unit comprises a control device for controlling the drive motor. The control device may in particular include a speed control of the motor, for example by use of a frequency converter. Further, said control device comprises at least one microprocessor and at least one storage means which is able to store at least one control program executable by said microprocessor. Further it is possible to store user applications into the storage means which may be executed by the microprocessor. To achieve this, the storage means may be designed in such way that it is possible to delete a user application or a user function as part of a user application stored in the storage means and replace it by a different user application or user function. Further, it may be possible to amend the stored user application or to add an additional user application or user function.

Furthermore, according to the invention the control device comprises or communicates with a programming module by which at least one user application can be modified or generated by a user himself and stored in said storage means. This means that the user is able to create a user application or at least one user function as a part of a user application for the pump by himself. This allows a flexible adjustment of the pump control to individual user requirements. The programming module does not only allow to change parameters or limit values as known from prior art pump units, but to create an entire user application or at least a user function or user application sequence, respectively, by the user himself. The user application in the meaning of the present invention is a program or a part of a program of the control device which can be changed or created by the user to establish desired functions of the pump control according to the user's requirements. A user function in the meaning of the invention is a part of a user application as a sequence of the user application. The control program of the pump may contain further parts which cannot be changed by the user. In particular the control device contains a basic program which cannot be changed by the user and responsible to control the basic functions of the drive motor of the pump, for example for controlling the frequency converter of the motor. The user application may interact with this basic program or address this basic program to choose certain operating conditions of the drive motor on basis of an user function, for example different modus speeds or to switch on or off the motor. The control of the motor at the desired speed is then for example established by the basic program of the control device. For this there may be an interpreter program as part of the entire control software or control program of the control device able to translate the user function so that the basic program can carry out the user functions of user application.

Said programming module is designed such that at least one input parameter, at least one operator, for example a logical operator and at least one action, for example of the drive motor or a connected device like a hydraulic device can be chosen as program elements and combined to generate or modify a user application in form of at least one user function or user application sequence, respectively. The action may also be an action of a further user function. Further, it may be possible to additionally choose one or more reference values or limits which are linked in a formula. For example an input parameter or input value may be compared by the special operator with a reference value or a limit. By choosing and introducing an action of the drive motor into the user application it is possible to define how the drive motor should react or be operated in response to a certain input value. For example it is possible to switch on or off the drive motor if an input value exceeds a predefined reference value or it is possible to adjust the speed of the motor in response to a certain input parameter. By choosing the input parameter and at least one operator and one action of the pump it is possible to create an individual user application or user function for the pump control which fulfills the individual requirements of the user. Thus, such user function or user application can be created or modified by the user himself and stored in the storage means of the pump, so that this user application can be executed by the pump control microprocessor. A user application may be understood as a kind of "macro".

The operator to be chosen may in particular be a logic operator as for example greater, smaller or equal to. Further, all other logic operators and any other suitable operator which may be used in an user application or a program sequence can be provided for creating such user application or user function.

The storage means preferably comprises a user application storage and an interpreter storage. The control device preferably is configured so that a user function or user application created by the user is stored in this user application storage. There may be an additional basic storage comprising a basic program which cannot be changed or created by user.

Preferably the said control device with said microprocessor and said storage means is located in at least one electronic housing or control box, respectively, arranged at said drive motor or in a housing of said drive motor. The electronic housing may be attached directly to the drive motor, for example on the outer circumference of the stator housing and/or the axial end of the stator housing. Alternatively it is possible to arrange the electronic housing at any other place of the pump unit, for example the electronic housing may be attached to the pump of the pump unit. Further, it is possible to integrate the control device into the housing of the drive motor, in particular into the stator housing.

Integrating the control device into the pump unit itself has the advantage that it is not necessary to connect the pump unit with an external control device. So it is very easy to install the pump, since preferably the only required electrical connection is a power supply for the pump unit. Additionally there may be a connection to external sensors or external devices which allow a communication with the pump control. Preferably such connections are provided as wireless connections.

According to a first preferred embodiment, the programming module is arranged in said at least electronic housing or control box. This means that the programming module is integrated into the electronic components arranged directly at the pump and/or the drive motor. This means that the programming unit is an integrated component of the pump unit.

According to a further embodiment, the programming module may be separated from the other parts of said control device and connected with said control device via a data interface. For example the programming module may be designed as a remote control used for creating the user function or user application and storing this user application into the storage means of the pump control. However, this remote control does not remain directly in or on the device formed by the pump and the drive motor, but is used only for programming or creating user application in form of at least one user function. After programming this remote control may be removed. According to a further preferred embodiment it may be possible to create the user application or user function in the remote device or remote control and subsequently transfer the user function or user application to the control device and the storage means by data connection or mobile storage medium. This allows to program different pump units with the same remote control. The remote control may be a special device or for example a standard personal computer handheld computer, mobile phone or other suitable device to be connected with the pump unit. Nevertheless, according to the invention it is preferred that the microprocessor and the storage means for executing the program function are integrated into the pump unit and in particular into an electronic housing or control box of the pump unit which is formed by a part of the drive motor housing or a separate housing attached to the drive motor and/or the pump. The programming module is connected with said control device via a data interface. This may be wireless interface like for example Bluetooth or WLAN or a wired interface. The interface may be a standard interface as for example a universal serial bus or internet connection or may be a proprietary interface.

Preferably the data interface comprises a network connection and in particular an internet connection. This allows transferring data to the control device via the network and preferably via the internet. In particular it is possible to transfer user functions or user applications to the control device and to store these user functions and user applications in the storage means of the control device.

Said programming module may be a separate hardware module or preferably a software module. This software module may be incorporated into the software of the control device itself or may be a separate software program which may be executed on an external device as for example a personal computer, notebook, mobile phone, tablet computer or a special remote control for programming the pump unit.

Further, said programming module is preferably designed such that several input parameters, several operators and/or several actions of said drive motor can be chosen as application or program elements and combined to generate at least one user function or user application. The input parameters may be values measured by external sensors or internal sensors which are incorporated into the pump unit. For example, these parameters may be temperature values, for example the temperature of a pumped media. Furthermore, the input parameters may be for example time or control signals received from external control devices as for example the heating control or a building management system, or electrical or mechanical parameters of the drive motor itself. The operators offered may in particular be logic operators as for example "equal to", "greater as", "smaller as" or the like. Further, all other suitable operators which may be needed to generate a user function or user application may be offered by the programming module so that the user may choose this operator and combine it with further offered program elements as in particular input parameters and actions of the drive motor to create a user application or user function. Further, the programming module may offer reference values which may be set by the user, for example to define temperature limits or similar limits in a program function. This allows comparing an input parameter with a reference value to start an action of the drive motor depending on the result of this comparison. The actions of the drive motor may in particular be to switch the drive motor on or off or the setting of a desired rotational speed of the drive motor.

According to a special embodiment said programming module may be designed such that at least one function or action of an external device can be chosen as a program element. This may for example starting or stopping or a speed control of a further external pump. Further, this may be the actuation of a valve or other control element. Furthermore, this may be a signal for an external control device as a building management system or heating control, an alarm signal or similar.

As is described above, at least one input parameter may be provided by at least one sensor arranged in said pump unit itself, at least one external sensor, a computing device, data storage means and/or a data network. In particular the input parameter may be a flow, a pressure or temperature value and measured by a sensor in the pump unit or a hydraulic system. Further, these input parameters may be signals from an external control or a building management system. It has to be understood that the input parameter may be any suitable parameter which may be used in a pump control.

As discussed before, the actions of that drive motor in particular comprise a switching on and off and/or a speed adjustment or speed control of said drive motor. In particular the rotational speed of the drive motor may be set to a desired speed. Further, the actions may also comprise an action of a connected device for example a hydraulic device as a valve connected with the control device of the pump unit or a further pump. Preferably, the actions also comprise an action of at least one further user function or user application. By this one user function or user application sequence may change a further user function for example on basis of a change of a certain input parameter.

Furthermore, it is preferred that said programming module comprises at least one display and at least one input device. With the use of this display and input device it is possible for the user to modify or create user functions or user applications by use of the programming module. In particular the programming module may comprise at least one display showing several program elements which can be chosen and combined for creating at least one user function. This makes the generating of a user function very easy for the user, since possible program elements are presented in the display so that the user can easily chose the required program element which is needed for a certain user function to be created. For example the different program elements as for example input parameters, operators, reference values and possible actions of the drive motor may be offered as icons, boxes or blocks on the display which can be combined by placing them into a desired order and setting the reference values as desired. This is very easy if the display is a touch screen display which acts as an input device. On such a touch screen display elements shown for example as blocks can easily be moved into the desired order to create the user function. Thus it is possible to create the user function or application without any special knowledge in programming.

According to a special embodiment said programming module is designed such that user functions can be stored manually or automatically from an external storage means or data network into said storage means. This means that the user functions or user applications may be created on an external remote control or computer and send for example via the network to the pump unit and stored in the storage means of the control device. Alternatively the programming module may be designed such that user functions or user applications may be chosen by the user and downloaded from an external storage means for example from an internet server.

Advantageously, the pump unit may be configured to receive or upload user applications, in particular through a network, web forum or a web service. Hereby, it is achieved that the user of the pump may upload or download user applications, i.e., user functions to the pump so that the pump unit becomes capable of performing in accordance with specific requirements. Further, it is possible to upload user functions or user applications created by the pump unit to an external storage or to a further pump unit which shall use the same user function or user application. Further, the pump unit may be able to download user applications to the pump automatically from the internet.

Advantageously, the pump is capable of only downloading user applications or user functions that are relevant to the specific type of pump unit. This may be accomplished by using a specific pump information tag that is registered by a server from which the user application is downloaded. This specific pump information tag may be any type of code or suitable tag that can be registered by the server.

Further, the pump unit preferably allows to receive user applications or user functions through a network or from an external storage means connectable to the pump unit or its control device. Hereby it is achieved that a number of pre-installed user applications can be provided to the pump unit by connecting to a network or external storage means. This procedure may be quick and easy and, if an external storage device is used, no network connection or knowledge about how to download information are required. The external storage means may be plugged in the pump unit or in the control device of the pump unit, however. It may also be an external storage type that communicates wirelessly with the pump unit. External storage means may be any suitable type of hardware including an electronic flash memory date storage device, a hard disc, USB flash device by way of example.

Further, the pump unit may be designed such that it can receive user applications or user functions via an e-mail sent to the pump unit.

Advantageously, the pump is connected to the Internet and the pump unit is configured to upload pump unit specific information to an external receiver and the pump unit is configured to perform automatic and selective download of user applications that are suitable for the specific type of pump unit. Hereby, it is achieved that the pump unit is capable of downloading relevant user applications that may be used in that specific type of pump unit. Advantageously, the pump unit is connected to the internet and is configured to perform automatic and selective download of information (e.g., weather forecast information) and use this information in one or more user application or user functions on the basis of one or more preset criteria.

Hereby, the pump unit will be capable of receiving information (e.g., about the weather) and use this information to adjust its operation. If, for example, the weather forecast anticipates a decrease in temperature, the pump may change the user application by a predefined action so that the pump is activated to a higher temperature threshold than before. This would be a desirable solution for a circulating pump unit. It is important to underline that any relevant type of information may be used to adjust the operation of the pump unit. Further, such information may be introduced into a user application created by the user himself. Furthermore, it may be possible to create a user application using different user functions or application sequences, respectively, dependent on such external information received from the Internet. Further, it may be possible to create user applications or user functions which are used time-depending.

Advantageously, the pump comprises a storage having a user application storage that is configured to store the user applications, a basic function storage that is used to store basic applications like a basic program and an interpreter storage that is allocated for an interpreter program that is configured to carry out interpretation of the user applications that are stored in the user application storage.

According to a further preferred embodiment of the invention the programming module may be designed such that it may communicate with an external device to change settings of said external device. By this the programming module may be able to change the behavior of said external device, for example a hydraulic device like a pump or valve, or a sensor. Thus, the user can change the settings of the external device by use of the programming module. For example by use of the programming module the operating area of a connected pressure sensor may be changed for example from 4 bar to 8 bar pressure. The programming module may communicate with the external device by any suitable data connection. Preferably the external device is permanently connected with the control device of the pump unit.

According to a preferred embodiment said pump unit is a centrifugal pump, preferably used as a recirculation pump, for example a heating recirculation pump. Such a pump may require an individual setting of a user application to adapt the pump control to a heating system.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the following the invention is described by way of example with reference to the accompanying drawings, in which.

DETAILED DESCRIPTION OF THE INVENTION

Figure 1:
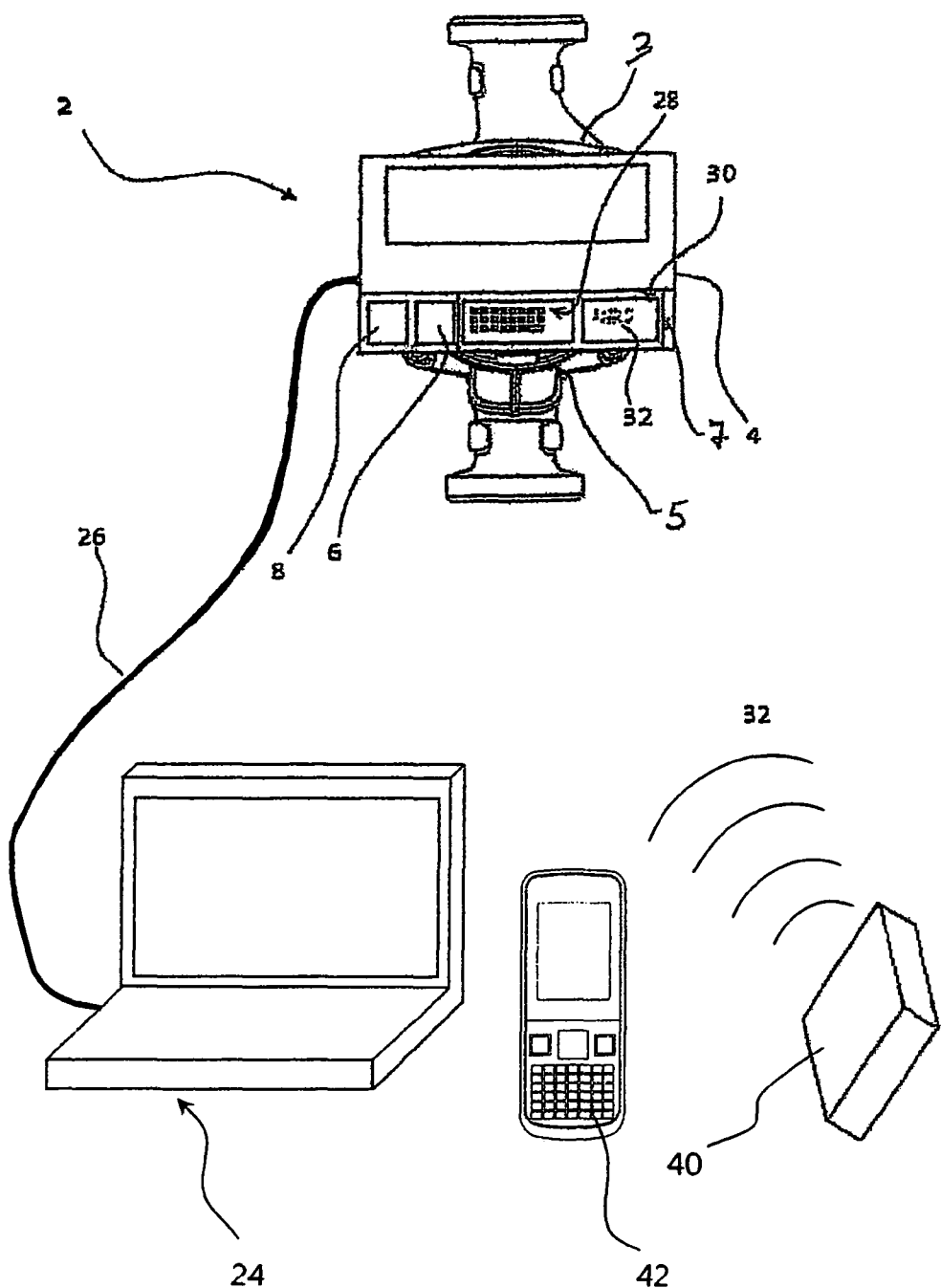
FIG. 1 shows a pump according to the invention.

Referring now in detail to the drawings for the purpose of illustrating preferred embodiments of the present invention, a pump unit 2 according to a preferred embodiment of the present invention is systematically illustrated in FIG. 1. The pump unit 2 comprises a control device 4 with storage means 6 and a microprocessor 8; an interface 28 and a display 30. In this example a computer 24 is connected to the pump unit 2 via a cable 26. The pump unit 2 comprises a pump 3 and an electric drive motor 5 which drives the pump 3. The drive motor 5 is controlled by the control device 4. In particular the control device is designed so that it can execute program functions or program sequences and in particular user applications which are stored in the storage means 6 by the microprocessor 8 to control the drive motors in a desired manner.

According to the invention the control device 4 comprises or communicates with a programming module 7, wherein the interface 28 and the display 30 form parts of the programming module 7. The programming module 7 is designed to create or modify user applications or user functions as part of a user application to be stored in the storage means 6 and to be executed by the microprocessor 8. This allows the user to create user applications or user functions himself to adjust the control of the pump unit 2 individually.

In the shown example a computer 24 is connected via a cable 26 with control device 4 in particular with the interface 28 of the control device 4. The computer 24 forms a part of the programming module 7 in particular in the form of a computer program running on said computer 24. Further, the computer 24 may be connected to a network like the internet where it would be possible to download user applications, in particular user functions to be executed by the control device 4. Further, a software module on said computer 24 may allow creating or modifying user applications on the computer 24. However, it would also be possible to design the programming module 7 without the need of an additional computer 24. The interface 28 may be a user interface in the form of an input device which allows the user to create or modify user functions and user applications directly in the pump unit 2 by the use of an input device 28 and the display 30.

Furthermore, the user of the pump unit 2 may use a handheld device e.g., mobile phone 42 to send data information like said user applications to the storage means 6 of the pump unit 2. It would also be possible to use a remote control 40 to send data information to the pumps storage means 6.

In the following it is described how a user application may be created by use of the programming module 7.

Figure 6:
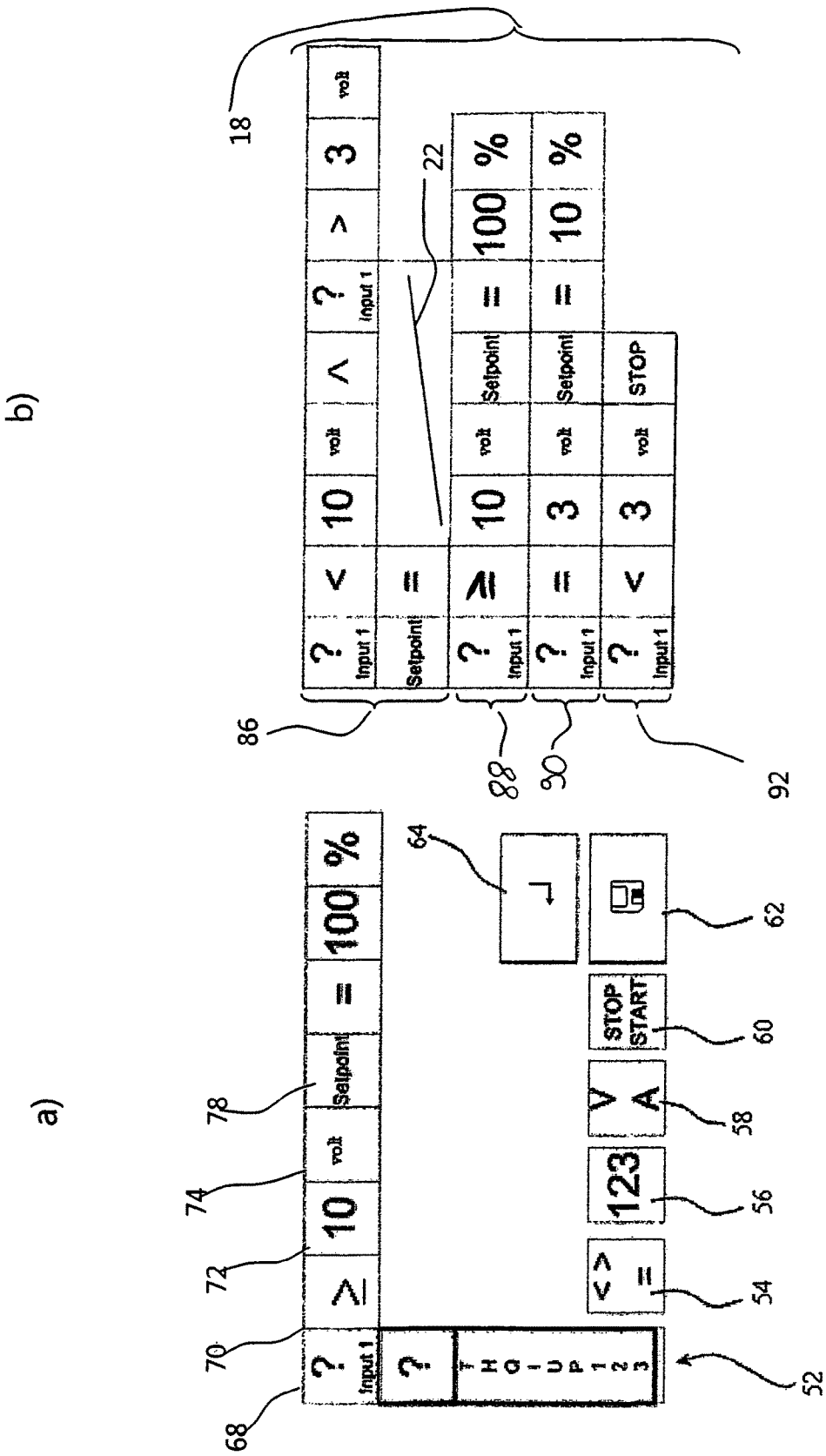
FIG. 6 shows the two last steps of the second user application creation.

The display 30 of the pump unit 2 shows a number of icons 32. The user of the pump unit 2 can easily compose a user application 18 by using these icons 32. In one embodiment according to the invention the pump unit 2 comprises a visual display 30 that is a touch screen that may be used to input data and hereby create a user application 18 (see FIG. 6).

In case the computer 24 is used, it would be possible to use wireless communication between the computer 24 and the pump unit 2 and between the mobile phone 42 and the pump unit 2.

FIG. 2a illustrates one way of creating a user application 18. FIG. 3a and FIG. 3b show the views of a display during a creation of a user application 18. At the bottom area of the display a list of predefined blocks or boxes 52, 54, 56, 58 and 60 are provided. The variable box 52 is highlighted and symbolized by a question mark represents an input parameter 13 or variable such as temperature or pressure by way of example. In the upper area of the display the box 68 shows that the user application 18 comprises a function or sequence that begins with the temperature as input parameter or variable 13. The temperature is indicated with a "T" in the box 68.

The box 54 comprises an operator 10 and symbolized by the mathematical symbols "less than" (<) and "more than" (>) represents an operator such as "equal to" (=); "less than" (<) or "more than" (>). This operator 10 may be a logic operator but it does not have to be. In the upper area of the display the operator box 70 shows that the second symbol in the user function is a "less than" symbol.

The box 56 symbolizes numerical values that can be selected by the user of the pump unit 2. In the numerical value box 56 the eligible numerical values are symbolized by the numbers "1 2 3". In the upper area of the display the box 72 shows that the third symbol in the user function is a scalar parameter 12 and that it has the value 80.

The box 58 symbolizes a unit that can be selected by the user of the pump unit 2. The unit box 58 is symbolized by the symbol "[ ]". In the upper area of the display the box 74 shows that the fourth symbol in the user function the unit 16 is ° C.

Figure 2:
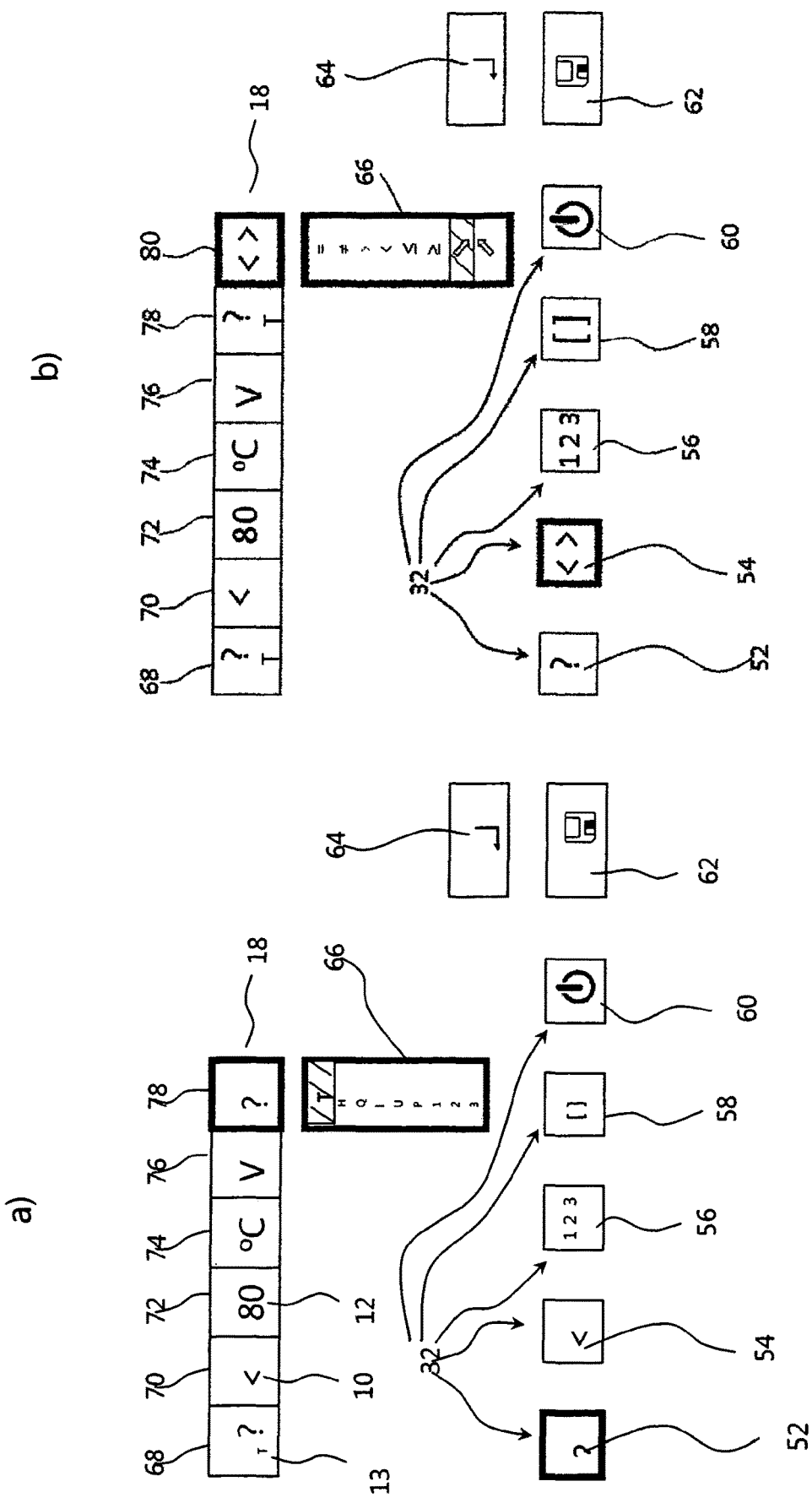
FIG. 2 shows the two first steps of a first user application creation.
Figure 3:
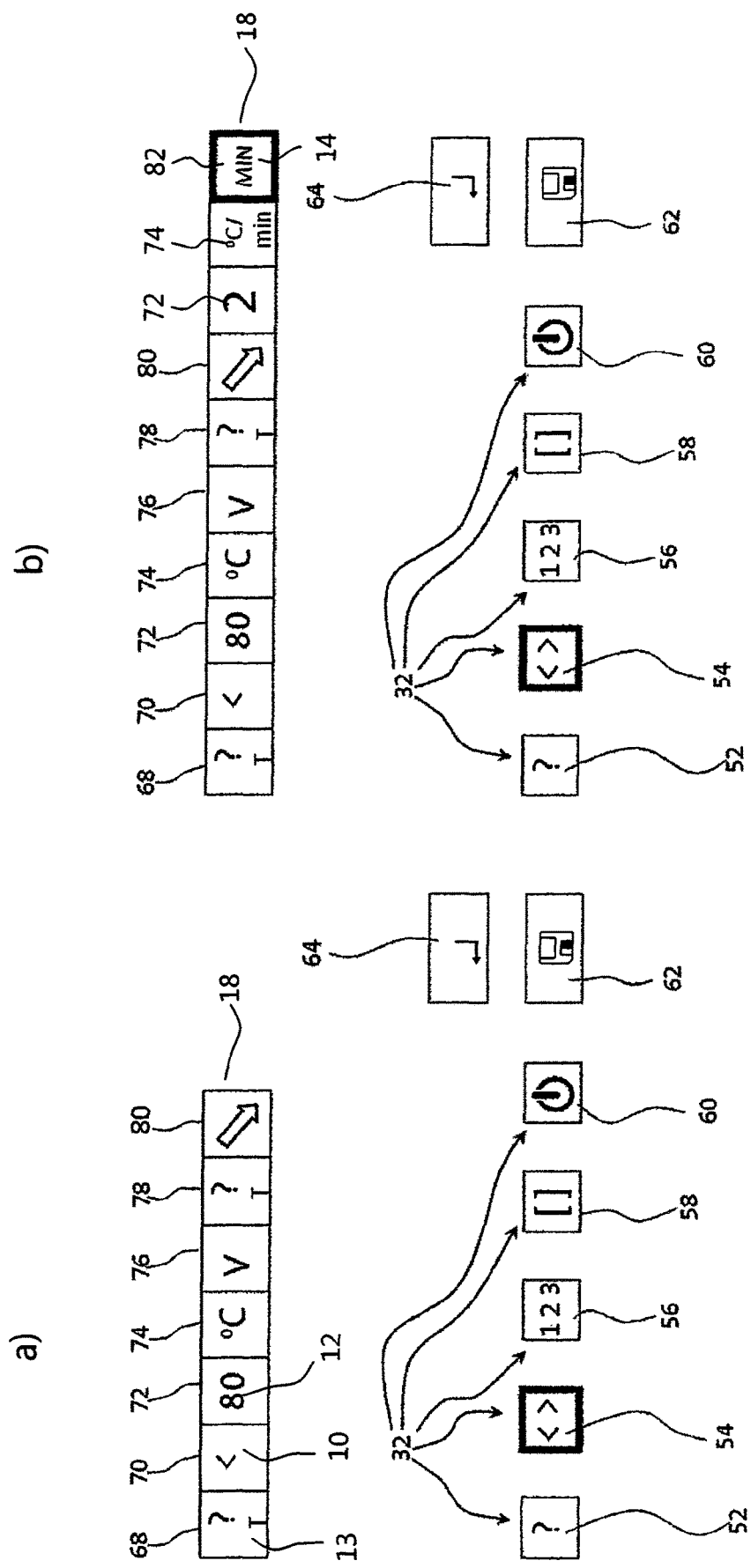
FIG. 3 shows two last steps of the first user application creation.

The box 60 symbolizes actions 14 of the drive motor 5 (e.g. start and stop of the pump operation or speed adjustment). In FIG. 2 and FIG. 3, the action box 60 is symbolized by a traditional start/stop symbol. The new line box 64 is used to make a new line and the save and run box 62 is used to save and run the user application. In the upper area of the display the box 76 shows a logic operator "or" indicated by the mathematical symbol "V" for or. The first box 78 from the right is highlighted and the user has selected to input a variable (that is why the variable box 52 is highlighted). Below the box 78 appears a drop-down menu box 66 and the variable that is selected is temperature indicated with the symbol "T".

FIG. 2b illustrates a display view where the user continues to compose the user application 18 that is illustrated in FIG.

2a. The user has selected the symbol box 54 and therefore the symbol box 54 is highlighted. Furthermore, an additional box 80 has been created by the user and this box 80 appears to the right in the upper area of the display. In the drop down menu 66 the user has selected the symbol "decreasing" indicated by a downwards directed arrow.

The further composition of the user application 18 is illustrated in FIG. 3a and FIG. 3b. In FIG. 3a it can be seen that the downwards directed arrow is shown in box 80. In FIG. 3b the user application 18 has been finished and the numerical value box 72 shows 2. The unit box 74 shows ° C./min and the action box 82 shows MIN. Thus, all in all the user applications 18 reads:

If the temperature falls below 80° C. or if the temperature falls at a rate of minimum 2° C. per minute the pump goes to MIN operation, where MIN operation is a preset state of operation.

Figure 4:
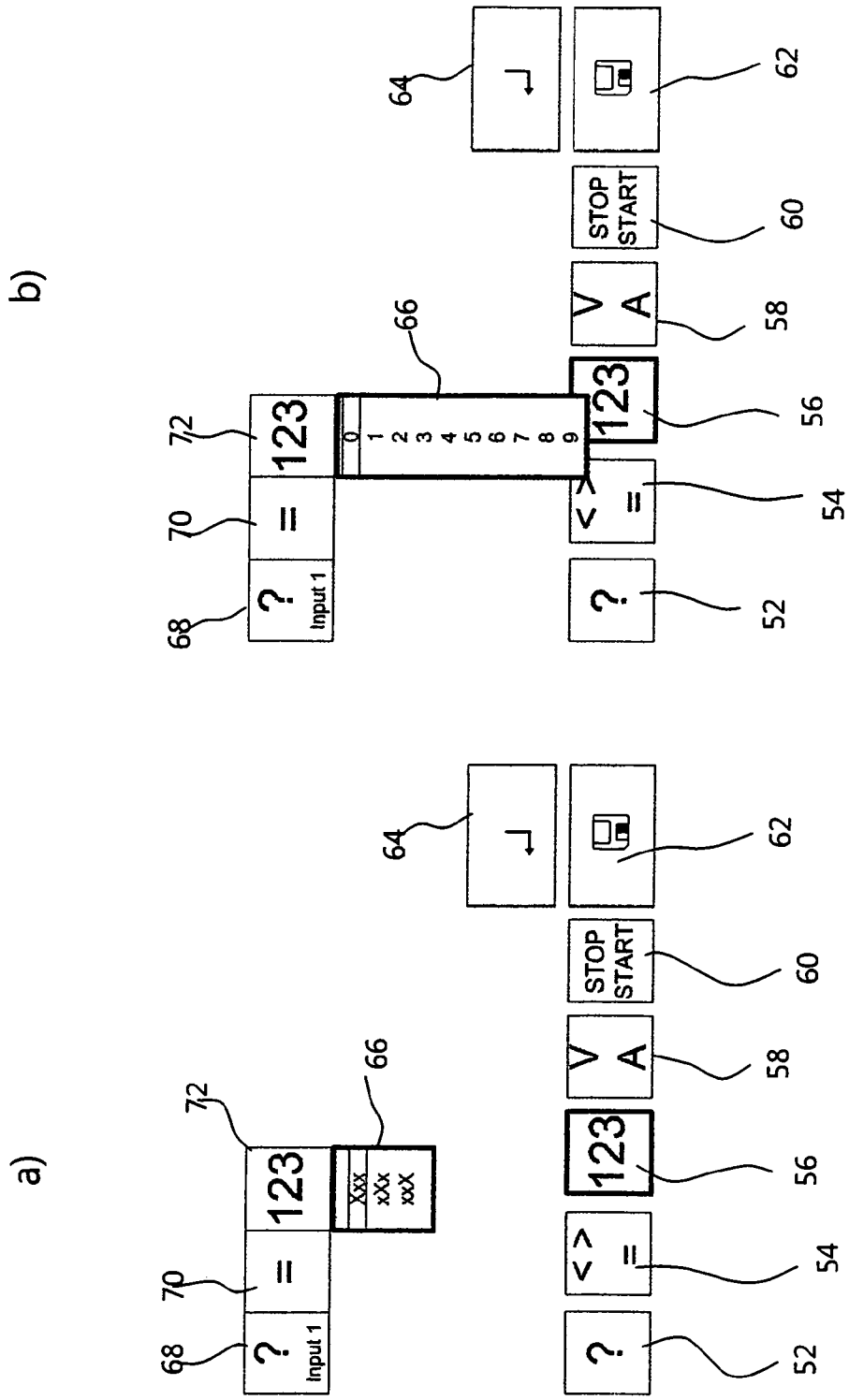
FIG. 4 shows the two first steps of a second user application creation.
Figure 5:
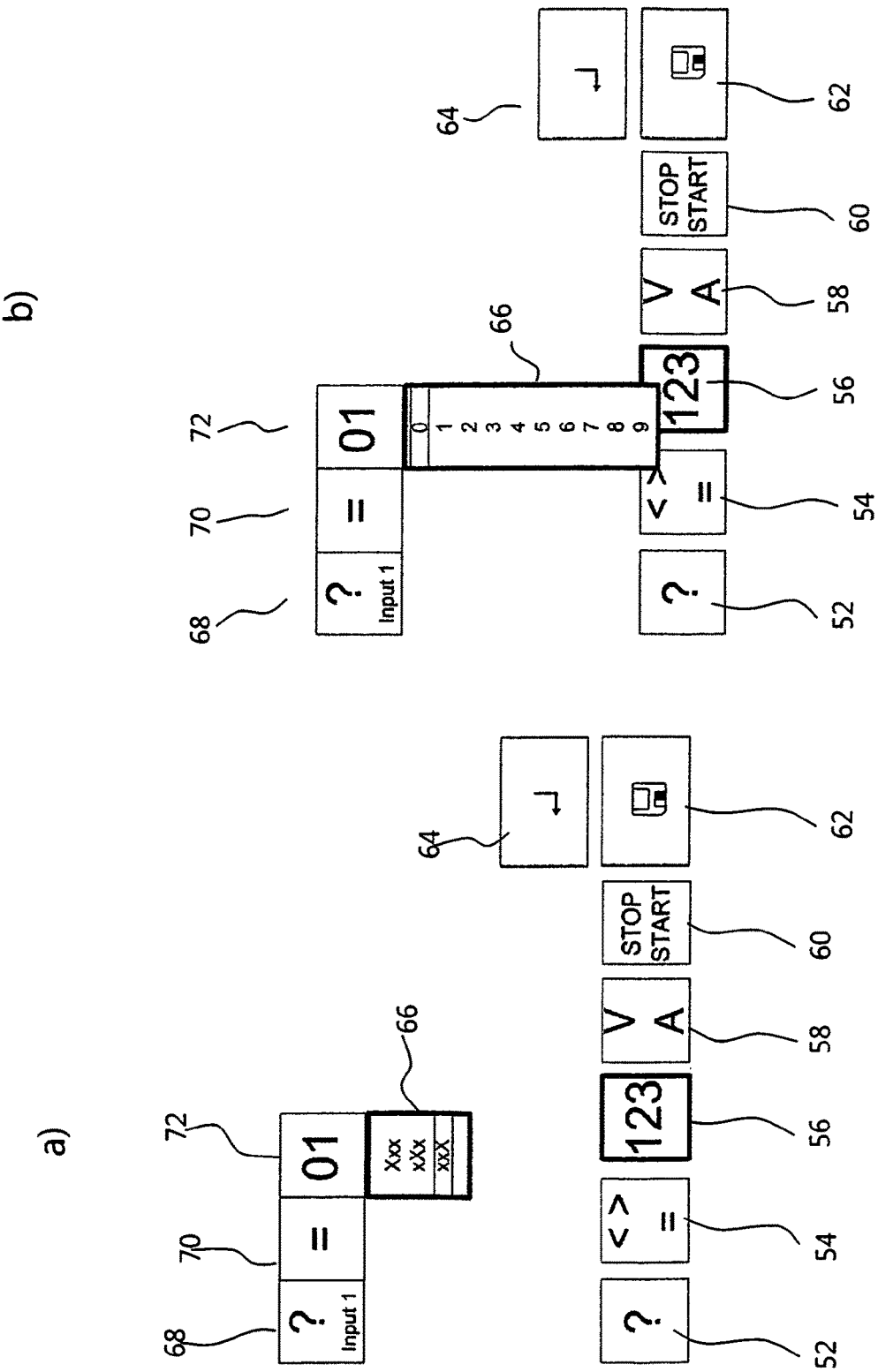
FIG. 5 shows two intermediate steps of the second user application creation.

FIG. 4 illustrates composition of another user application 18 that is intended to control the pump operation according to a voltage input. In FIG. 4a the user of the pump unit 2 has selected an input "Input 1" in the variable box 68. The operator box 70 shows the symbol equal to indicated with the mathematical symbol "=". The user has just selected the numerical value box 72 and the drop-down menu box 66 gives a list that the user can choose from. In FIG. 4b the user is selecting the first two digits of the numerical value. In FIG. 5a it can be seen that the first two digits of the numerical value are "01" indicated in the numerical value box 72. In FIG. 5b the third digit of the numerical value is being selected and from drop-down menu box 66. The third digit is "0" and thus the value is "10" as illustrated in the numerical value box 72 in FIG. 6a.

In FIG. 6b the completed user application 18 is shown. This user application 18 comprises four user application sequence sections 86, 88, 90, 92. The first section 86 defines that if the input voltage is below 10 volt and above 3 volt then the set point of the drive motor speed is adjusted linearly between 10% and 100% according to the input voltage. This is illustrated by a linear curve symbol 22. The second section 88 defines that if the input voltage is larger than or equal to 10 volt then the set point is set to 100%. The third section 90 defines that if the input voltage is 3 volt then the set point is set to 10%. The fourth section 92 defines that if the input voltage is lower than 3 volt then the pump stops.

Figure 7:
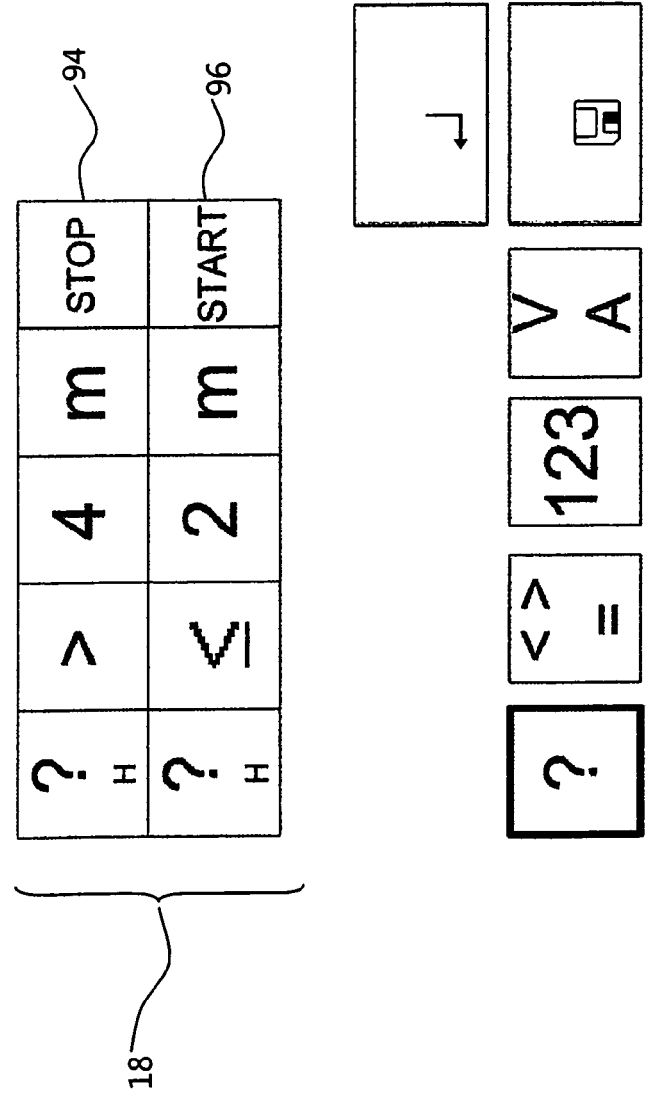
FIG. 7 shows a third user application creation.

FIG. 7 illustrates a user application 18 having two lines 94, 96. The first line 94 defines that if the head exceeds 4 meters (indicated with "m") then the drive motor stops. The second line 96 defines that if the head equals or falls below 2 m then the drive motor 5 is activated.

It is possible to have a huge number of various user applications 18. One example of such user application 18 may define that the drive motor 5 is set to start at the same hour every day. Generally it is possible to combine any possible input parameter with any suitable operator and a desired action of the drive motor to provide a program function or program sequence as a user application which allows to control the drive motor in response to input signals or input parameters.

It would be possible to use different types of user interface and ways of creating the user applications 18.

Figure 8:
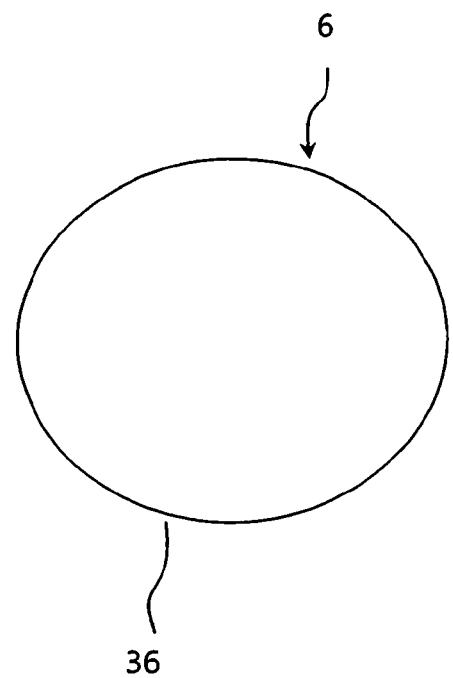
FIG. 8 shows a memory of a pump according to the invention.
Figure 8:
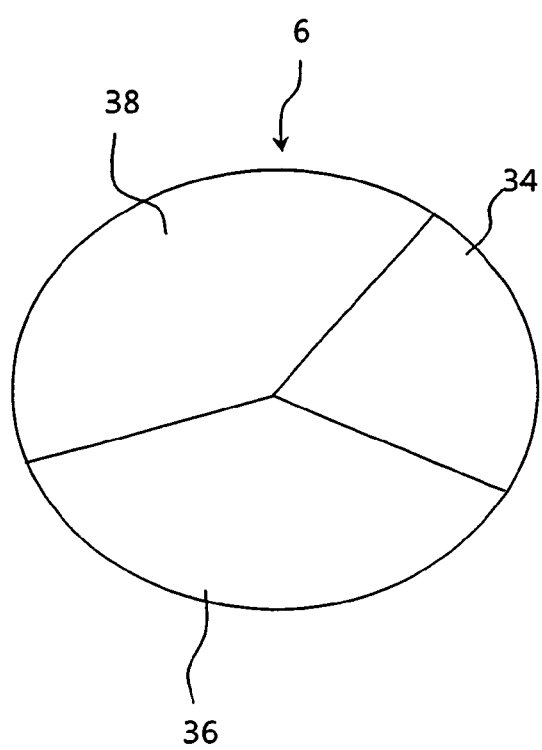

FIG. 8a is a schematic view of a storage 6 of a control device for a prior art pump. The storage 6 comprises a basic function storage 36 that is used to store basic applications like a basic program, which cannot be modified by the user. These basic applications may be any type of application that is needed for carrying out the basic function of the pump unit 2. The user of the pump may change settings and parameters in the basic function storage 36 to adapt preset applications to the requested needs according to the prior art. However, the user of the pump unit is not able to create entire new applications as user functions or program sequences that are not already included in the basic function storage 36.

FIG. 8b is a schematic view of storage means 6 according to the invention. The storage means 6 comprise a user application storage 34 that is configured to store user applications 18. These user applications 18 may be composed by the user or may be pre-installed by way of example. The user applications may also be downloaded to the user application storage 34. The storage means 6 further more comprise a basic function storage 36 that is used to store basic applications. These basic applications may be any type of application that is needed for carrying out the basic function of the pump unit 2. The storage means 6 moreover comprise an interpreter storage 38 that is allocated for the interpreter program and execution of the user applications 18 that are stored in the user application storage 34.

Figure 9:
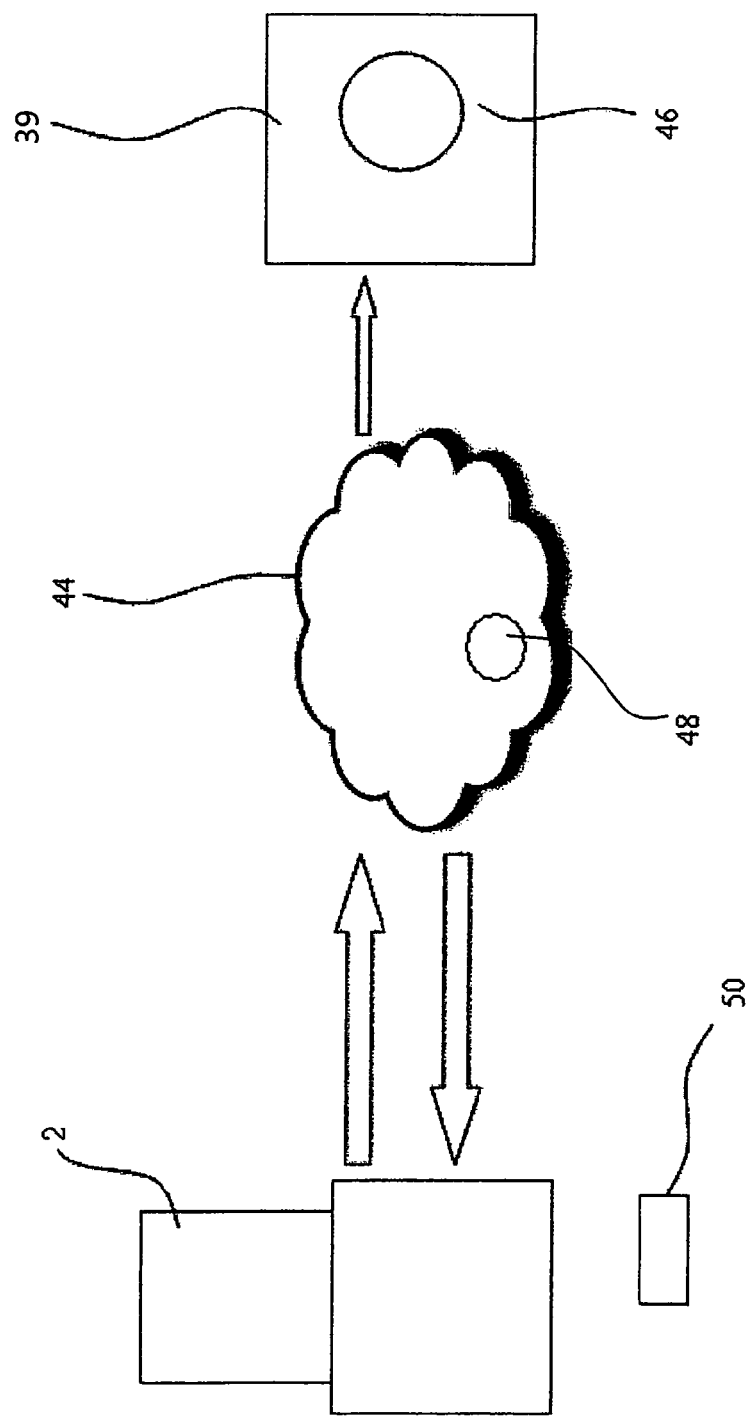
FIG. 9 shows a schematic view of a pump that communicates via the Internet.

FIG. 9 is a schematic view of a pump unit 2 according to one embodiment of the invention. The pump unit 2 is configured to communicate via the Internet 44. Information and data such as user applications 18 may be uploaded and downloaded to the pump unit 2. Weather forecast information 48 may by way of example be send to the pump unit 2. The pump unit 2 may also upload pump specific information 46 to an external receiver 39 by using the Internet 44. An external memory 50 is provided so that it would be possible to apply user applications 18 that are stored in the external memory 50. The user applications 18 may be downloaded from the Internet 44 to the external memory 50 by way of example.

Further, it would be possible for the pump unit 2 to receive sensor signals or signals as input parameters via a network connection. For example the pump unit 2 may be connected to a building management system or central heating control.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A pump unit (2) having an electrical drive motor (5) and a control device (4) for controlling the drive motor (5), wherein said control device (4) comprises at least one microprocessor (8) and storage means (6) configured to store at least one control program executable by said microprocessor (8), the storage means (6) comprising a user application storage (34) configured to store at least one user application and an interpreter storage (38), the interpreter storage being configured to store an interpreter program configured to carry out interpretation of the at least one user application stored in the user application storage (34), wherein said control device (4) comprises or communicates with a programming module (7) by which the at least one user application is at least one of created or modified and stored in said user application storage of the storage means, wherein said programming module (7) is configured to provide a plurality of input parameters (13), a plurality of operators (10) and a plurality of actions (14) for selection as program elements and combined to generate at least one user function (18) of said user application which is executed by said microprocessor such that a user is able to create a user function by selecting at least one of the operators for combination with at least one of the input parameters and at least one of the actions, wherein the control device (4) with said microprocessor (8) and said storage means (6) are located in at least one electronic housing arranged at said drive motor (5) or in a housing of said drive motor (5), at least one of the plurality of input parameters (13) is provided by at least one sensor arranged in the pump unit, at least one external sensor, a computing device, a data storage means, and/or a data network, the plurality of operators (10) are logic operators, and the plurality of actions (14) comprise a switching on and off and/or a speed adjustment of the drive motor, and wherein the programming module (7) comprises at least one display (30) configured to show several program elements which can be chosen and combined for creating the at least one user function, wherein the microprocessor (8) executes the user application to control the drive motor (5) according to the at least one of the operators, at least one of the input parameters, and at least one of the actions selected by the user.

2. The pump unit according to claim 1, wherein said programming module (7) is a software module.

3. The pump unit according to claim 1, wherein said programming module (7) is designed such that several of the plurality of input parameters (13), several of the plurality of operators (10) or several of the plurality of actions (14) of said drive motor (5) or combinations thereof can be chosen as program elements and combined to generate at least one user function (18) of said user application.

4. The pump unit according to claim 1, wherein said programming module (7) is designed such that at least one action of an external device can be chosen as a program element.

5. The pump unit according to claim 1, wherein said programming module (7) is designed such that at least one action of the drive motor or a further user function can be chosen as program elements.

6. The pump unit according to claim 1, wherein said programming module (7) further comprises at least one input device (28).

7. The pump unit according to claim 6, wherein said display (30) is a touch screen display and acts as an input device.

8. The pump unit according to claim 1, wherein the programming module (7) is designed such that it may communicate with an external device to change settings of said device.

9. The pump unit according to claim 1, wherein said pump unit (2) is a recirculation pump.

* * * * *